US008219052B2

(12) United States Patent
Ueoka et al.

(10) Patent No.: US 8,219,052 B2
(45) Date of Patent: Jul. 10, 2012

(54) INFORMATION PROVIDING SYSTEM

(75) Inventors: Shohji Ueoka, Kobe (JP); Yuki Wakabayashi, Kobe (JP); Kazuma Fujiwara, Kobe (JP); Yuusaku Matsuda, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 0 days.

(21) Appl. No.: 12/968,930

(22) Filed: Dec. 15, 2010

(65) Prior Publication Data

US 2011/0159836 A1 Jun. 30, 2011

(30) Foreign Application Priority Data

Dec. 25, 2009 (JP) ................................. 2009-296429

(51) Int. Cl.
*H04B 1/18* (2006.01)
*H04K 3/00* (2006.01)

(52) U.S. Cl. ................ 455/161.1; 455/184.1; 455/185.1

(58) Field of Classification Search ................. 455/3.01, 455/161.1–161.3, 184.1, 185.1, 186.1, 456.1–456.5
See application file for complete search history.

(56) References Cited

U.S. PATENT DOCUMENTS

2011/0159800 A1* 6/2011 Ueoka et al. ................. 455/3.06

FOREIGN PATENT DOCUMENTS

JP A 2005-252965 9/2005
JP A 2008-206032 9/2008

* cited by examiner

*Primary Examiner* — Lee Nguyen
(74) *Attorney, Agent, or Firm* — Oliff & Berridge, PLC

(57) ABSTRACT

An information providing system is provided. An in-vehicle apparatus is provided in a vehicle. The in-vehicle apparatus receives a broadcasting. An information providing apparatus transmits area information related to a broadcast channel that is receivable in a traveling area of the vehicle to the in-vehicle apparatus. A storage unit stores the area information for each traveling area. A receiving unit receives probe information including a predetermined reference position or a position of the vehicle from the in-vehicle apparatus. A deciding unit decides a reference area set including a plurality of traveling areas which are within a predetermined distance from the reference position included in the received probe information for each vehicle. An accumulating unit accumulates the received probe information. A determining unit determines a traveling record of the vehicle in each traveling area on the basis of the accumulated probe information. An update unit updates the reference area set on the basis of the traveling record. A transmitting unit transmits the area information corresponding to the reference area set before the update to the in-vehicle apparatus corresponding to the reference area set when the update unit has not yet performed the update, and transmits the area information corresponding to the reference area set after the update to the in-vehicle apparatus corresponding to the reference area set when the update unit has performed the update.

4 Claims, 12 Drawing Sheets

FIG. 4

PROBE HISTORY

| VEHICLE | TYPE OF VEHICLE | PROBE INFORMATION RECEPTION DATE AND TIME | KIND OF BROADCAST | FRE-QUENCY | RECEPTION INTENSITY | POSITION |
|---|---|---|---|---|---|---|
| N1 | α | 2009.01.01.12:00 | AM | A | XXX | LATITUDE 34°38'58.9"N AND LONGITUDE 135°00'04.7"E |
| ⋮ | ⋮ | 2009.02.01.12:00 | ⋮ | B | YYY | ⋮ |
| ⋮ | ⋮ | ⋮ | FM | ⋮ | ⋮ | ⋮ |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| N2 | ⋮ | ⋮ | AM | ⋮ | BBB | ⋮ |
| ⋮ | ⋮ | ⋮ | ⋮ | ⋮ | ⋮ | ⋮ |
| ⋮ | ⋮ | ⋮ | FM | ⋮ | ⋮ | ⋮ |
| ⋮ | ⋮ | ⋮ | ⋮ | ⋮ | ⋮ | ⋮ |
| ⋮ | β | ⋮ | ⋮ | ⋮ | ⋮ | ⋮ |
| ⋮ | | | ⋮ | ⋮ | ⋮ | ⋮ |

*FIG. 5*

AREA INFORMATION

| MESH ID | TYPE OF VEHICLE | KIND OF BROADCAST | FRE-QUENCY | RECEPTION INTENSITY |
|---|---|---|---|---|
| xxx | $\alpha$ | AM | A | XXX |
| ⋮ | ⋮ | ⋮ | B | YYY |
| ⋮ | ⋮ | FM | C | ZZZ |
| ⋮ | ⋮ | ⋮ | D | AAA |
| ⋮ | ⋮ | ⋮ | ⋮ | ⋮ |
| yyy | $\beta$ | AM | E | EEE |
| ⋮ | ⋮ | ⋮ | F | FFF |
| ⋮ | ⋮ | ⋮ | G | GGG |
| ⋮ | ⋮ | ⋮ | ⋮ | ⋮ |
|  |  | ⋮ | ⋮ | ⋮ |

FIG. 6

AREA SET INFORMATION

| VEHICLE | MESH ID |
|---|---|
| N1 | 001/002/···/xxx |
| N2 | 111/112/···/yyy |
| ⋮ | ⋮ |

FIG. 8B
FIG. 8A
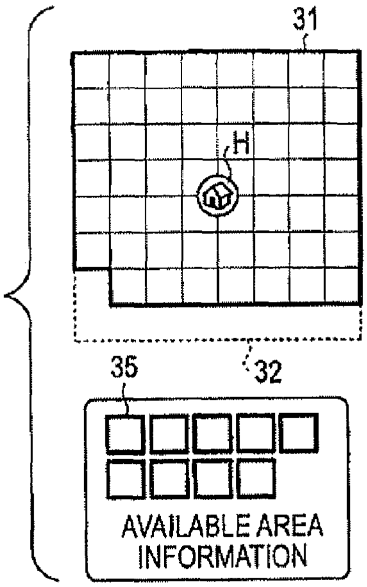
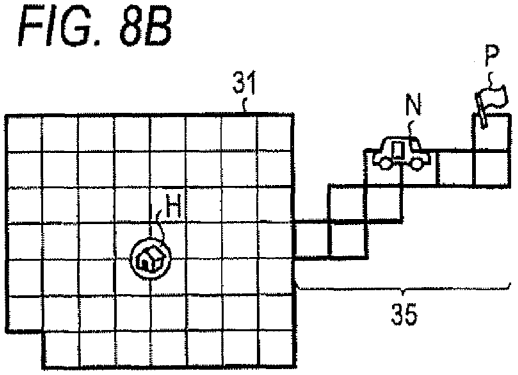
FIG. 8D
FIG. 8C
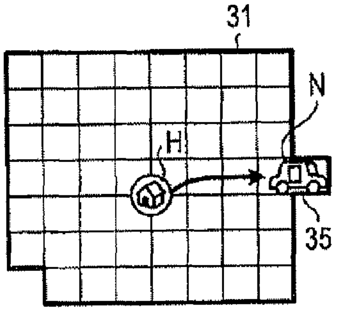
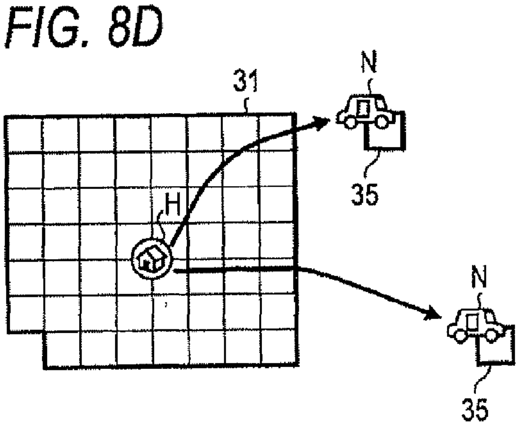

INFORMATION PROVIDING SYSTEM

INFORMATION PROVIDING SYSTEM

The disclosure of Japanese Patent Application No. 2009-296429 filed on Dec. 25, 2009, including specification, drawings and claims is incorporated herein by reference in its entirety.

BACKGROUND

The present invention relates to an information providing system and more particularly, to an information providing system capable of reducing the number of times an in-vehicle apparatus receiving a broadcast receives information related to a broadcast channel which can be received in a traveling area of a vehicle from an information providing apparatus and the amount of information received from the information providing apparatus by the in-vehicle apparatus.

An information providing system has been proposed in which a predetermined server provides information related to a broadcast channel that can be received at a position where a broadcast receiving apparatus is disposed.

For example, JP-A-2005-252965 discloses an information providing system in which, when a center providing information receives information indicating an installation position from a broadcast receiving apparatus, the center returns information related to a broadcast channel that can be received at the installation position of the broadcast receiving apparatus.

According to the information providing system, for example, a newly installed broadcast receiving apparatus does not need to independently search for a receivable broadcast channel, but can easily set the broadcast channel that can be received at the installation position on the basis of information received from the center.

However, in the information providing system disclosed in JP-A-2005-252965, when the broadcast receiving apparatus is an in-vehicle apparatus, there is a concern that the number of times the in-vehicle apparatus receives information from the center or the amount of information received from the center will increase.

That is, the position where the in-vehicle apparatus receives a broadcast is frequently changed with the traveling of the vehicle. Therefore, whenever a broadcast is not received due to a change in the receiving position, the in-vehicle apparatus needs to receive the information of the broadcast channel that can be received at the changed receiving position from the center.

For example, when the vehicle repeatedly travels along a route from a position where a broadcast can be received to a position where a broadcast cannot be received and from the position where a broadcast cannot be received to the original position, the in-vehicle apparatus needs to receive the information of a broadcast channel that can be received at each position from the center whenever the vehicle travels.

In this way, in the information providing system according to the related art, there is a problem that the number of times the in-vehicle apparatus receives the information of the broadcast channel that can be received at each receiving position from the center increases.

When the center transmits, for example, the information of the whole country of Japan as the information related to the broadcast channel that can be received at each receiving position to the in-vehicle apparatus, it is possible to reduce the number of times the in-vehicle apparatus receives information from the center.

However, when the center transmits the information about the whole country of Japan related to the broadcast channel that can be received at each receiving position to the in-vehicle apparatus, there is a new problem that the amount of information received by the in-vehicle apparatus from the center increases.

SUMMARY

It is therefore an object of at least one embodiment of the present invention to provide an information providing system capable of reducing the number of times an in-vehicle apparatus receiving a broadcast receives information related to a broadcast channel which can be received in a traveling area of a vehicle from an information providing apparatus and the amount of information received from the information providing apparatus.

In order to achieve at least one of the above-described objects, according to an aspect of the embodiments of the present invention, there is provided an information providing system, comprising: an in-vehicle apparatus provided in a vehicle, the in-vehicle apparatus that receives a broadcasting; and an information providing apparatus that transmits area information related to a broadcast channel that is receivable in a traveling area of the vehicle to the in-vehicle apparatus, wherein the information providing apparatus includes: a storage unit storing the area information for each traveling area; a receiving unit that receives probe information including a predetermined reference position or a position of the vehicle from the in-vehicle apparatus; a deciding unit that decides a reference area set including a plurality of traveling areas which are within a predetermined distance from the reference position included in the probe information received by the receiving unit for each vehicle; an accumulating unit that accumulates the probe information received by the receiving unit; a determining unit that determines a traveling record of the vehicle in each traveling area on the basis of the probe information accumulated in the accumulating unit; an update unit that updates the reference area set on the basis of the traveling record of the vehicle, determined by the determining unit; and a transmitting unit that transmits the area information corresponding to the reference area set before the update to the in-vehicle apparatus corresponding to the reference area set when the update unit has not yet performed the update, and transmits the area information corresponding to the reference area set after the update to the in-vehicle apparatus corresponding to the reference area set when the update unit has performed the update.

According to the aspect of the embodiments the invention, the information providing apparatus determines the reference area set including a plurality of traveling areas disposed around the reference position which is received from the in-vehicle apparatus, and transmits the area information of the determined reference area set to the in-vehicle apparatus. Then, the information providing apparatus updates the reference area set on the basis of the traveling record of each vehicle in each traveling area, and transmits the area information of the updated reference area set to the in-vehicle apparatus. Therefore, it is possible to reduce the number of times the in-vehicle apparatus receives information related to the broadcast channel that can be received in the traveling area of the vehicle from the information providing apparatus and the amount of information received from the information providing apparatus.

BRIEF DESCRIPTION OF THE DRAWINGS

In the accompanying drawings:

FIG. 4 is a diagram illustrating an example of a probe history according to this embodiment;

FIG. 5 is a diagram illustrating an example of area information according to this embodiment;

FIG. 6 is a diagram illustrating an example of area set information according to this embodiment;

FIGS. 8A to 8D are diagrams illustrating a modification of the procedure of creating the updated area set according to this embodiment;

DETAILED DESCRIPTION OF THE EMBODIMENTS

Figure 1A:
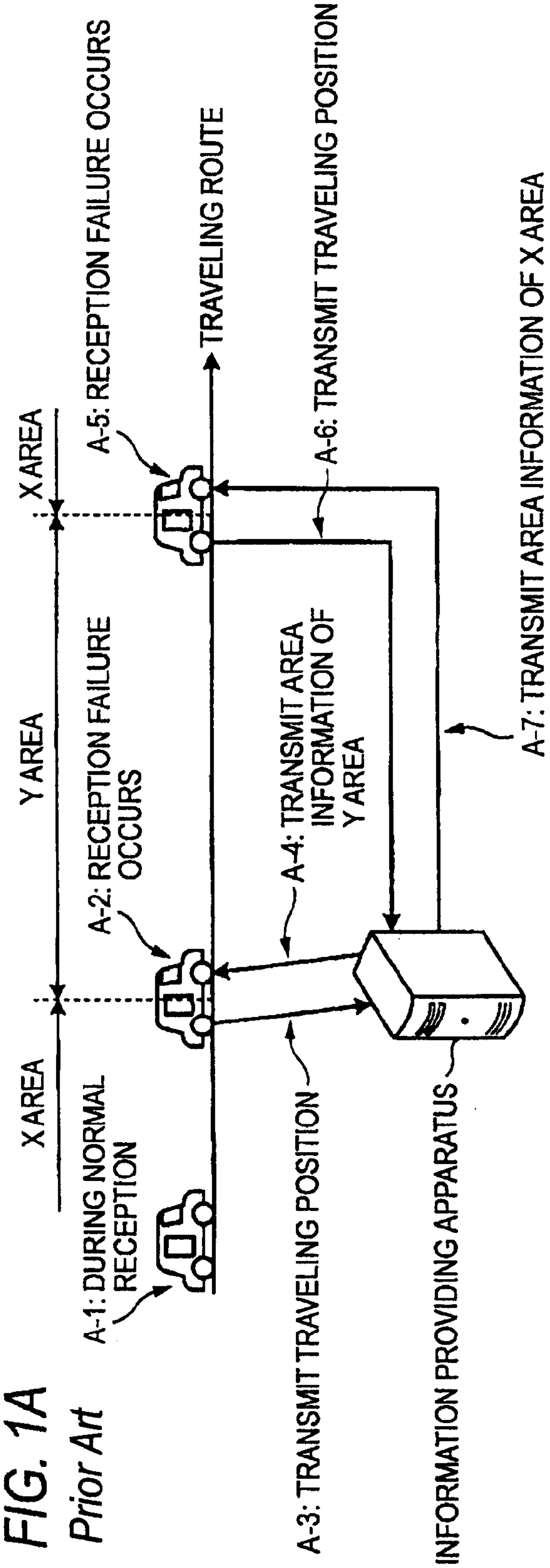
FIG. 1A Prior Art
FIGS. 1A and 1B are diagrams illustrating the outline of an information providing system according to the related art.
Figure 1B:
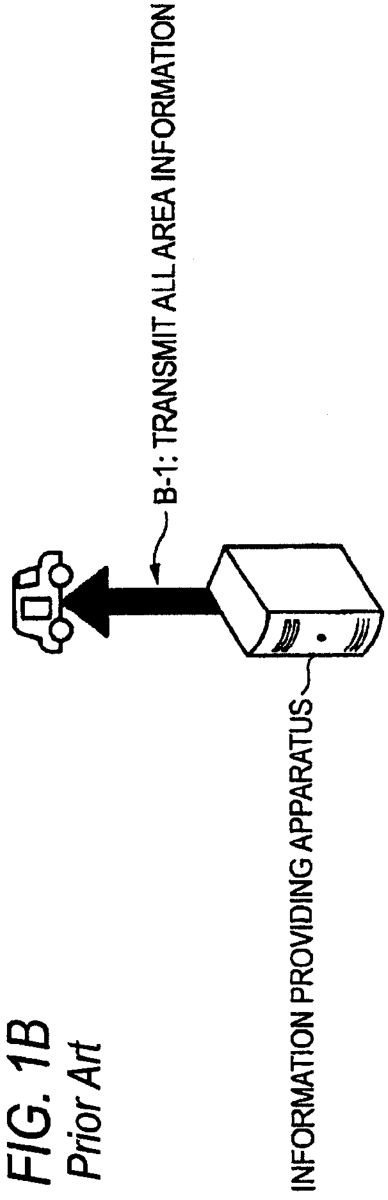
FIG. 1B Prior Art
Figure 2:
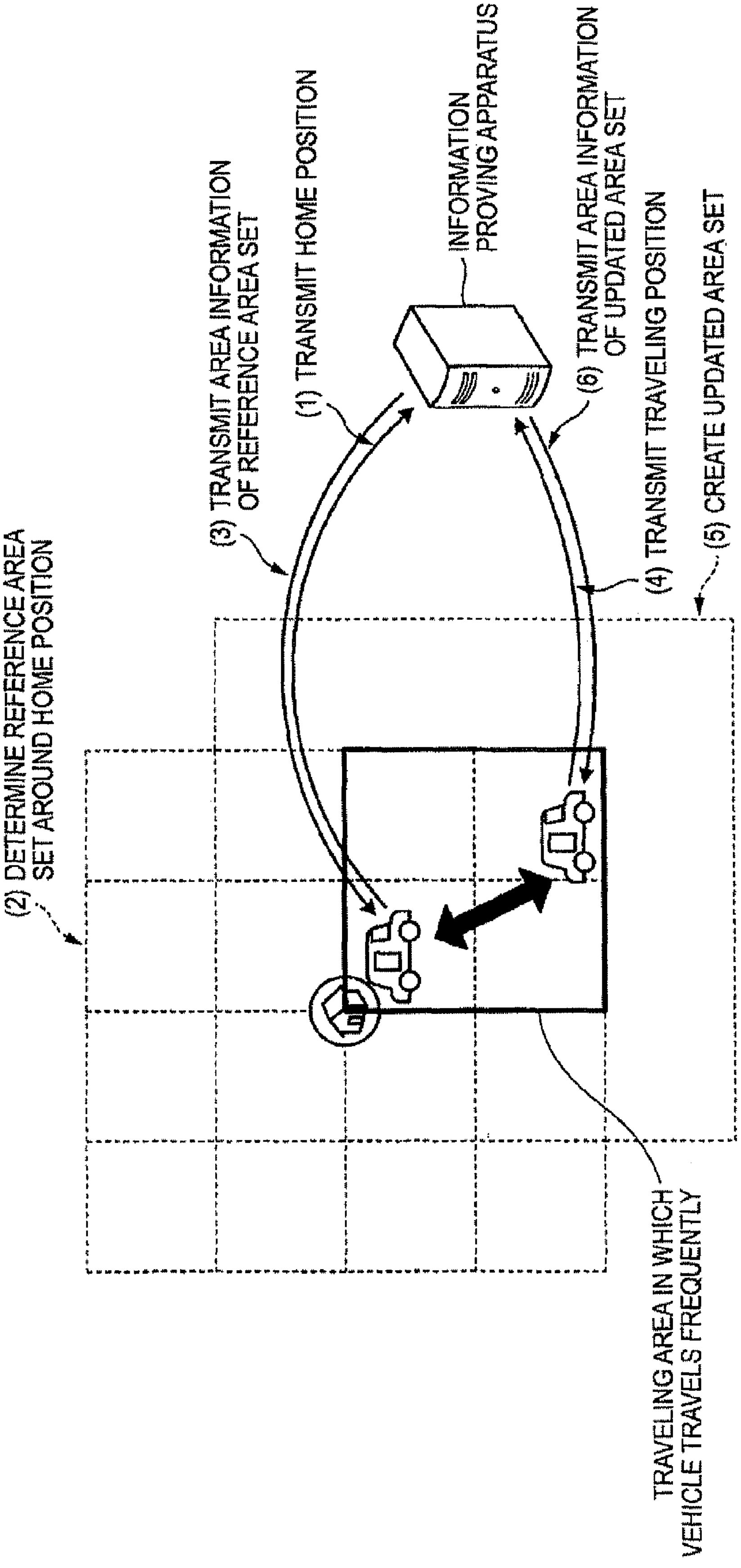
FIG. 2 is a diagram illustrating the outline of an information providing system according to the invention.

Hereinafter, an information providing system according to an exemplary embodiment of the invention will be described in detail with reference to the accompanying drawings. First, the outline of an information providing system according to the invention will be described in comparison with the information providing system according to the related art before the exemplary embodiment of the invention is described in detail. FIGS. 1A and 1B are diagrams illustrating the outline of the information providing system according to the related art, and FIG. 2 is a diagram illustrating the outline of the information providing system according to the invention.

As shown in FIGS. 1A and 1B, the information providing system according to the invention includes an in-vehicle apparatus that is provided in each vehicle and receives a broadcast and an information providing apparatus that provides information (hereinafter, referred to as "area information") related to a broadcast channel that can be received in each traveling area to each in-vehicle apparatus.

The traveling area indicates each divided area divided from an area on the map, in which a vehicle provided with the in-vehicle apparatus travels. In the following description, each traveling area has a square shape having one side with a length of 1 km (so-called three-dimensional mesh), but the length of one side of each traveling area is not limited to 1 km. In addition, the shape of each traveling area is not limited to a square.

In the information providing system according to the related art, when the reception state of a broadcast deteriorates due to the traveling of the vehicle, the in-vehicle apparatus receives area information related to the broadcast channel that can be received in the traveling area of the vehicle from the information providing apparatus.

For example, as shown in FIG. 1A, it is assumed that the in-vehicle apparatus in the vehicle that travels in an X area normally receives a broadcast (see (A-1) in FIG. 1A). Then, it is assumed that the vehicle enters a Y area and failure in receiving the broadcast occurs in the in-vehicle apparatus (see (A-2) in FIG. 1A).

As such, when a reception failure occurs, the in-vehicle apparatus transmits the current traveling position to the information providing apparatus (see (A-3) FIG. 1A). When receiving the traveling position of the vehicle from the in-vehicle apparatus, the information providing apparatus sends back the area information of the Y area corresponding to the received traveling position (see (A-4) FIG. 1A).

When receiving the area information of the Y area from the information providing apparatus, the in-vehicle apparatus sets a broadcast channel that can be received in the Y area on the basis of the received area information. In this way, the in-vehicle apparatus can receive normal broadcast signals.

Thereafter, in a case in which the vehicle returns to the X area, when the vehicle enters the X area, a reception failure occurs in the in-vehicle apparatus again (see (A-5) FIG. 1A). As such, when a reception failure occurs, the in-vehicle apparatus transmits the current traveling position to the information providing apparatus again (see (A-6) FIG. 1A), and receives the area information of the X area from the information providing apparatus (see (A-7) FIG. 1A).

However, in the information providing system according to the related art, for example, when the vehicle repeatedly travels along a route from the X area to the Y area and from the Y area to the X area, the in-vehicle apparatus needs to receive the area information of the traveling area from the information providing apparatus whenever the vehicle travels along the route.

Therefore, the information providing system according to the related art has a problem in that the number of times the in-vehicle apparatus receives the area information of each traveling area from the information providing center increases.

Meanwhile, as shown in FIG. 1B, for example, when the information providing apparatus transmits area information related to the whole country of Japan to the in-vehicle apparatus (see (B-1) FIG. 1B), it is possible to reduce the number of times the in-vehicle apparatus receives the area information from the information providing apparatus.

However, in this case, there is a new problem that the amount of area information received by the in-vehicle apparatus from the information providing apparatus increases. In addition, the in-vehicle apparatus needs a memory capable of storing the area information related to all traveling areas of Japan. Therefore, there is a concern that manufacturing costs will increase.

However, in the information providing system according to the invention, a reference area set, which is a set of reference traveling areas, is determined for each in-vehicle apparatus, and the reference area set is updated on the basis of the traveling record of the vehicle provided with the in-vehicle apparatus. In this way, according to the information providing system of the invention, it is possible to reduce the number of times the in-vehicle apparatus receives the area information from the information providing apparatus and the amount of area information received by the in-vehicle apparatus from the information providing apparatus.

Specifically, as shown in FIG. 2, in the information providing system according to the invention, first, the in-vehicle apparatus transmits a predetermined reference position (here, the home position of the user of the in-vehicle apparatus) to the information providing apparatus (see (1) in FIG. 2).

When receiving the home position from the in-vehicle apparatus, the information providing apparatus determines a set of reference areas around the home position (see (2) in FIG. 2). For example, the information providing apparatus determines a set of 16 traveling areas in a region that is within 4 km from the home position as the reference area set.

Then, the information providing apparatus transmits the area information of the determined reference area set to the in-vehicle apparatus (see (3) in FIG. 2). That is, the information providing apparatus transmits the area information of 16 traveling areas forming the reference area set to the in-vehicle apparatus.

In the invention, the in-vehicle apparatus receives the area information of the reference area set from the information providing apparatus and stores it. However, the area information of the reference area set may be stored in the in-vehicle apparatus in advance.

For example, when the purchaser buys the in-vehicle apparatus, the area information of a set of reference areas around a predetermined reference position designated by the purchaser may be stored in the in-vehicle apparatus and then the in-vehicle apparatus may be delivered to the purchaser.

When receiving the area information of the reference area set from the information providing apparatus, the in-vehicle apparatus stores the received area information. Then, when the vehicle enters a new traveling area in the reference area set, the in-vehicle apparatus sets a receivable broadcast channel on the basis of the stored area information.

In this way, even when the vehicle travels through the traveling areas with different receivable broadcast channels several times while traveling in the reference area set, the in-vehicle apparatus does not need to receive new area information from the information providing apparatus. Therefore, it is possible to reduce the number of times the in-vehicle apparatus receives the area information from the information providing apparatus.

Since the in-vehicle apparatus receives only the area information of the reference area set from the information providing apparatus, it is possible to reduce the amount of area information received, as compared to the case in which the area information of the whole country of Japan is received.

Thereafter, the in-vehicle apparatus transmits the traveling position of the vehicle in each traveling area through which the vehicle travels to the information providing apparatus (see (4) in FIG. 2). The information providing apparatus sequentially stores the traveling position of the vehicle received from the in-vehicle apparatus and the reception history of the traveling position.

The information providing apparatus determines the traveling frequency of each vehicle in each traveling area on the basis of the stored traveling position of the vehicle and discriminates the traveling area through which each vehicle frequently travels from the traveling area through which the vehicle rarely travels.

Then, the information providing apparatus deletes the traveling area through which the vehicle rarely travels from the reference area set. When the vehicle frequently travels in the traveling areas forming the edge of the reference area set, the information providing apparatus adds new traveling areas to the reference area set.

For example, as shown in FIG. 2, the information providing apparatus newly adds the traveling area that has not been included in the reference area set among the traveling areas disposed around the traveling area through which the travel frequently travels to the reference area set.

As such, the information providing apparatus updates the traveling areas forming the reference area set on the basis of the traveling frequency of each vehicle in each traveling area (see (5) in FIG. 2). In the following description, the updated reference area set is referred to as an "updated area set".

Then, the information providing apparatus repeatedly updates each traveling area forming the updated area set on the basis of the traveling frequency of each vehicle. In this way, the information providing apparatus can create an updated area set only for each vehicle according to the traveling record of each vehicle.

Then, the information providing apparatus transmits the area information of the created updated area set to the in-vehicle apparatus (see (6) in FIG. 2). The in-vehicle apparatus stores the area information received from the information providing apparatus. Then, when the vehicle enters a new traveling area in the updated area set, the in-vehicle apparatus sets a receivable broadcast channel on the basis of the stored area information.

As such, in the information providing system shown in FIG. 2, the information providing apparatus creates the updated area set only for each vehicle on the basis of the traveling frequency of each vehicle in each traveling area and transmits the area information of the created updated area set to the in-vehicle apparatus.

In other words, the information providing apparatus learns the region in which each vehicle is expected to travel on the basis of the traveling record of each vehicle and transmits only the area information of the region to the in-vehicle apparatus.

Therefore, the in-vehicle apparatus does not receive the area information of the traveling area through which the vehicle rarely travels, but can appropriately receive the area information of the traveling area in which the vehicle is expected to travel frequently.

In the information providing system according to the invention, when the information providing apparatus transmits the area information of the updated area set to the in-vehicle apparatus, the information providing apparatus removes the area information that has been transmitted from the area information of the updated area set and transmits the area information.

For example, when the information providing apparatus has transmitted previous area information of the reference area set to the in-vehicle apparatus last time and is currently transmitting the area information of the updated area set, the information providing apparatus removes the area information of the reference area set remaining in the updated area set from the area information of the updated area set and transmits the area information of the updated area set.

The in-vehicle apparatus receives only the area information of the traveling areas that are not included in the reference area set in the updated area set and stores the received area information, thereby updating the area information (differential update).

In this way, since the in-vehicle apparatus does not receive and store all area information of the updated area set, it is possible to reduce the amount of area information received from the information providing apparatus. After the information providing apparatus updates the area information of the reference area set remaining in the updated area set, it transmits all area information of the updated area set to the in-vehicle apparatus.

As such, according to the information providing system of the invention, since the information providing apparatus transmits the area information of the reference area set to the in-vehicle apparatus, the in-vehicle apparatus does not need to receive the area information from the information providing apparatus even when the vehicle enters a new traveling area in the reference area set. Therefore, it is possible to reduce the number of times the in-vehicle apparatus receives the area information from the information providing apparatus and the amount of area information received by the in-vehicle apparatus from the information providing apparatus.

According to the information providing system of the invention, since the information providing apparatus transmits the area information of the updated area set (updated reference area set) to the in-vehicle apparatus, the in-vehicle apparatus can selectively receive the area information of the traveling area through which the vehicle is likely to travel.

According to the information providing system of the invention, when the information providing apparatus transmits the area information of the updated area set, it transmits area information corresponding to the difference between the updated area set and the reference area set to the in-vehicle apparatus. Therefore, it is possible to reduce the amount of area information received by the in-vehicle apparatus.

Next, embodiments of the information providing system according to the invention will be described in detail. In the following embodiments, an in-vehicle apparatus receiving a radio broadcast is given as an example. The in-vehicle apparatus according to the invention may receive any broadcast, such as digital television broadcasts, as well as radio broadcasts.

Figure 3:
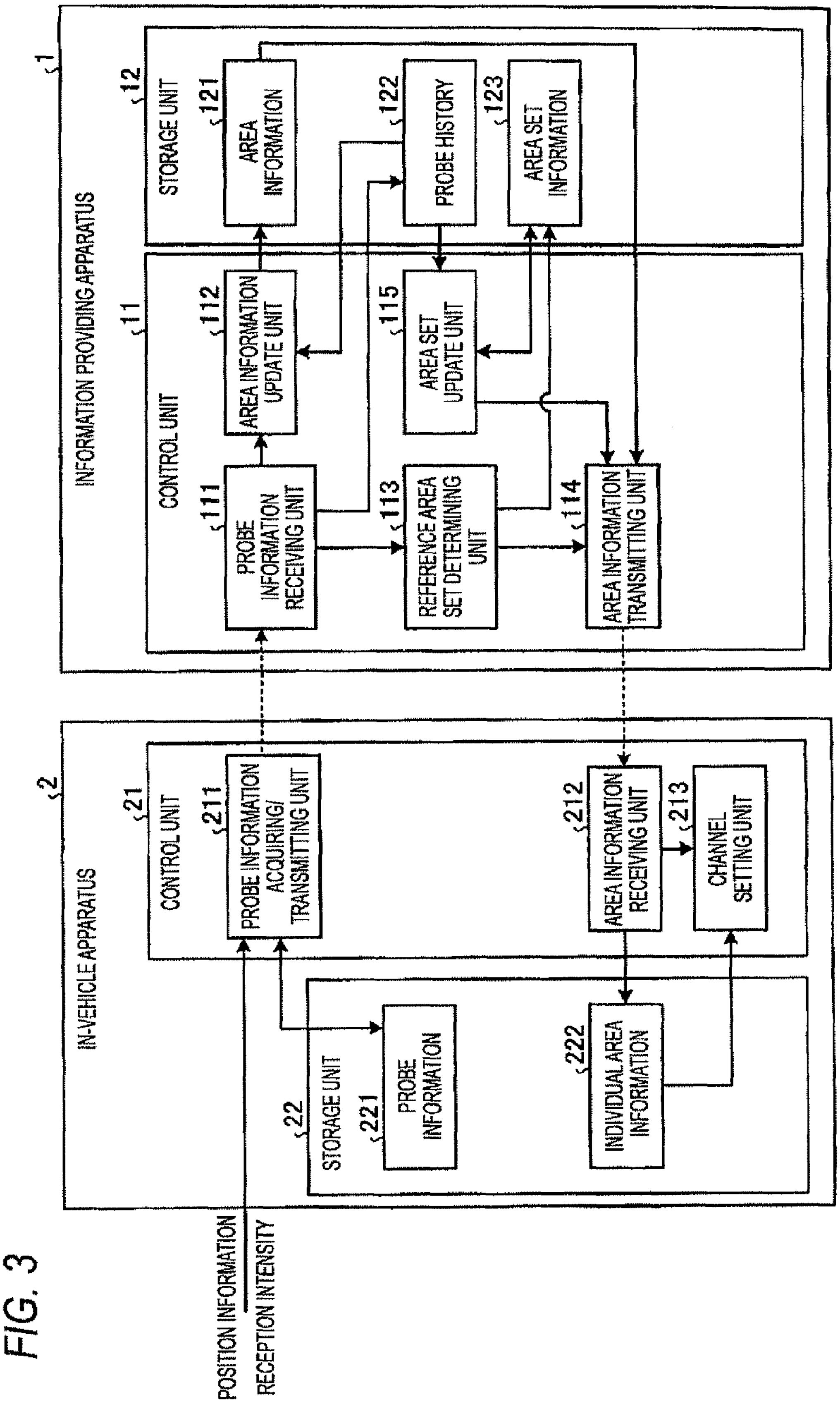
FIG. 3 is a block diagram illustrating the structure of an information providing system according to an embodiment.

FIG. 3 is a block diagram illustrating the structure of an information providing system according to this embodiment. FIG. 3 shows only components required to describe the characteristics of the information providing system, but does not show general components.

As shown in FIG. 3, the information providing system includes an in-vehicle apparatus 2 that is provided in a vehicle and receives a broadcast and an information providing apparatus 1 that transmits area information 121 related to a broadcast channel which can be received in the traveling area of the vehicle to the in-vehicle apparatus 2.

The information providing apparatus 1 includes a control unit 11 and a storage unit 12. The storage unit 12 is an information storage device that stores the area information 121, a probe history 122, and area set information 123.

The probe history 122, the area information 121, and the area set information 123 will be described with reference to FIGS. 4 to 6. FIG. 4 is a diagram illustrating an example of the probe history 122 according to this embodiment, FIG. 5 is a diagram illustrating an example of the area information 121 according to this embodiment, and FIG. 6 is a diagram illustrating an example of the area set information 123 according to this embodiment.

The probe history 122, the area information 121, and the area set information 123 will be described in this order. The probe history 122 is obtained by storing plural kinds of information included in probe information received by the information providing apparatus 1 from each in-vehicle apparatus 2 and the reception history of the probe information.

Specifically, as shown in FIG. 4, information capable of identifying the vehicle provided with the in-vehicle apparatus 2, information capable of identifying the kind of vehicle, the date and time where the probe information is received, the kind, frequency and reception intensity of broadcasts received by the in-vehicle apparatus 2, and the position of the in-vehicle apparatus 2 are stored in the probe history 122 so as to be associated with each other.

For example, as shown in FIG. 4, information indicating that the probe information is received from a vehicle N1 of type α at 12 o'clock on Jan. 1, 2009 and information indicating that the in-vehicle apparatus 2 transmitting the probe information receives an AM broadcast with a frequency A at a reception intensity of XXX at latitude 34°38'58.9"N and longitude 135°00'04.7"E are stored in the probe history 122.

FIG. 4 shows the probe history 122 related to a radio broadcast. Therefore, in FIG. 4, a frequency is stored as the broadcast channel. In the case of a probe history related to a television broadcast, a channel corresponding to each broadcasting station is stored as the broadcast channel.

As an example of the reception intensity shown in FIG. 4, any value may be used as long as it can determine whether the reception state of broadcast is good or bad. For example, the intensity of the electric field of a received broadcast signal may be used as the reception intensity.

A value obtained by comprehensively evaluating, for example, the degree of mixture of multiple paths (radio waves reflected from peripheral objects) included in the broadcast signal, the degree of interference between the received broadcast signal and a broadcast signal transmitted from another broadcasting station, and the misjudgment ratio of a reception frequency due to arbitrary noise may be used as the reception intensity.

Next, the area information 121 will be described. The area information 121 is a database that stores broadcast channels which can be received in each traveling area. The area information 121 is constructed and updated by the control unit 11. In addition, the area information 121 is constructed using only the probe information that is determined to be valid among a plurality of probe information items received by the information providing apparatus 1 from each in-vehicle apparatus 2.

In the area information 121, as shown in FIG. 5, a mesh ID for identifying each traveling area, the type of vehicle that can receive a broadcast in each traveling area, the kind of broadcasting that can be received, a frequency, and the average reception intensity of a broadcast in each traveling area are stored so as to be associated with each other.

The area information 121 is transmitted as individual area information 222 from the information providing apparatus 1 to the in-vehicle apparatus 2. The in-vehicle apparatus 2 can set a high-frequency broadcast with high reception intensity in the traveling area in which the vehicle travels, with reference to the received individual area information 222.

Next, the area set information 123 will be described. As shown in FIG. 6, in the area set information 123, a plurality of mesh IDs is associated with each vehicle. That is, in the area set information 123, a plurality of traveling areas is associated with each vehicle. The procedure of creating the area set information 123 will be described below with reference to FIGS. 7A to 7D.

The control unit 11 transmits the individual area information 222 to the in-vehicle apparatus 2 with reference to the area set information 123. The control unit 11 selects only the area information 121 of the traveling area associated with each vehicle with reference to the area set information 123 and transmits the selected area information as the individual area information 222.

For example, in the case of the area set information 123 shown in FIG. 6, the control unit 11 selects the area information 121 related to the traveling areas with the mesh IDs 001, 002, . . . , and xxx for the in-vehicle apparatus 2 of a vehicle N1 and transmits the selected area information as the individual area information 222.

Returning to FIG. 3, the control unit 11 is a processing unit that controls the overall operation of the information providing apparatus 1 and is formed by an information processing device including, for example, a CPU (Central Processing Unit), a ROM (Read Only Memory), and a RAM (Random Access Memory).

The control unit 11 includes a probe information receiving unit 111, an area information update unit 112, a reference area set determining unit 113, an area set update unit 115, and an area information transmitting unit 114 which are implemented by the CPU to read various kinds of programs from the ROM and execute the programs using the RAM as a work area.

The probe information receiving unit 111 is a processing unit that receives the probe information 221 from the in-vehicle apparatus 2 and outputs the probe information 221 to the area information update unit 112. In addition, the probe information receiving unit 111 stores the received probe information 221 in the probe history 122.

The probe information 221 received by the probe information receiving unit 111 includes information for identifying each vehicle or the type of vehicle, the kind, frequency, and reception intensity of broadcast received by the in-vehicle apparatus 2, and the position of the in-vehicle apparatus 2.

The probe information 221 transmitted from the in-vehicle apparatus 2 that newly uses the area information providing system according to this embodiment includes a predetermined reference position, which is the traveling start point of the vehicle in addition to the above-mentioned information.

In particular, when the predetermined reference position is included in the received probe information 221, the probe information receiving unit 111 outputs the reference position and information (hereinafter, referred to as "vehicle information") capable of identifying the vehicle to the reference area set determining unit 113.

The reference area set determining unit 113 determines a reference area set consisting of a plurality of traveling areas existing around the reference position on the basis of the reference position input from the probe information receiving unit 111. The procedure of determining the reference area set will be described below with reference to FIGS. 7A to 7D.

The area information update unit 112 is a processing unit that updates the area information 121 on the basis of the probe information 221 input from the probe information receiving unit 111 and the probe information 221 stored in the probe history 122.

When new probe information 221 (hereinafter, referred to as "new probe information") is input from the probe information receiving unit 111, the area information update unit 112 determines the validity of the new probe information and updates the area information 121 using only the new probe information that is determined to be valid.

Specifically, the area information update unit 112 reads a group of probe information 221 with the same broadcast channel as that of the new probe information in the probe information 221, which is transmitted from the same traveling area as that from which the new probe information is transmitted, from the probe history 122.

The area information update unit 112 creates a normal distribution for the reception intensity of a broadcast signal in the traveling area from which the new probe information is transmitted, using the group of probe information 221 read from the probe history 122.

Then, the area information update unit 112 sets an appropriate range, which is a standard for determining the validity of the reception intensity, in the created normal distribution. The area information update unit 112 sets the range of the reception intensity whose distribution is concentrated, that is, the range of reception intensity in which the number of probe information items 221 with the same reception intensity is greater than a predetermined value as the appropriate range.

When the reception intensity included in the new probe information is within the appropriate range, the area information update unit 112 determines that the new probe information is valid. In addition, the area information update unit 112 determines the validity of the new probe information that has been determined to be invalid in the determination of validity based on the normal distribution again, considering a variation in the reception environment.

The reason for this is that, when the reception intensity included in the new probe information is quite different from the reception intensity included in many probe information items 221 that were received from the same traveling area, the reception environment is likely to be changed in the traveling area from which the new probe information is transmitted.

Therefore, when it is determined that the new probe information is invalid on the basis of the normal distribution, the area information update unit 112 reads the latest probe information 221 received from the same traveling area as that from which the new probe information is transmitted, and compares the reception intensity of the read probe information 221 with the reception intensity of the new probe information.

The term "latest" means a period (for example, within one week) before a predetermined period has elapsed from the date and time when the new probe information has been transmitted. When the difference between the compared reception intensities is within a predetermined range, the area information update unit 112 determines that the new probe information is valid.

The area information update unit 112 updates the area information 121 using only the new probe information that is determined to be valid. In this way, the reliability of the area information 121 is improved.

The reference area set determining unit 113 is a processing unit that determines a reference area set consisting of a predetermined number of traveling areas existing within a predetermined distance from the reference position when the reference position and vehicle information are input from the probe information receiving unit 111.

The reference area set determining unit 113 outputs a mesh ID of each traveling area forming the determined reference area set and the vehicle information to the storage unit 12 so as to be associated with each other, thereby registering the area set information 123.

In addition, the reference area set determining unit 113 outputs the mesh ID of each traveling area forming the determined reference area set and the vehicle information to the area information transmitting unit 114. The area information transmitting unit 114 reads the area information 121 of a traveling area corresponding to the mesh ID input from the reference area set determining unit 113 from the storage unit 12.

The area information transmitting unit 114 transmits the area information 121 read from the storage unit 12 as the individual area information 222 to the in-vehicle apparatus 2 of a vehicle corresponding to the vehicle information input from the reference area set determining unit 113.

The area set update unit 115 is a processing unit that periodically refers to the probe information 221 stored in the probe history 122 to update the area set information 123. That is the area set update unit 115 updates the area set information 123 in order to add and delete the traveling areas in the reference area set, thereby updating the reference area set. In the following description, the updated reference area set is referred to as an "updated area set".

In addition, when the created updated area set needs to be updated, the area set update unit 115 periodically refers to the probe information 221 stored in the probe history 122 in order to add or delete the traveling areas in the updated area set, thereby updating the updated area set.

The procedure of creating the update area will be described below with reference to FIGS. 7A to 7D. When the area set information 123 is updated, the area set update unit 115 outputs the vehicle information and the mesh ID in the updated area set information 123 to the area information transmitting unit 114.

In addition, the area set update unit 115 outputs the mesh ID of each traveling area and the vehicle information to the area information transmitting unit 114.

The area information transmitting unit 114 is a processing unit that reads the area information 121 from the storage unit 12 and transmits the read area information 121 to the in-vehicle apparatus 2. When the mesh ID and the vehicle information are input from the reference area set determining unit 113 or the area set update unit 115, the area information transmitting unit 114 reads the area information 121 of a traveling area corresponding to the input mesh ID from the storage unit 12.

Then, the area information transmitting unit 114 transmits the area information 121 read from the storage unit 12 as the individual area information 222 to the in-vehicle apparatus 2 of a vehicle corresponding to the vehicle information input from the reference area set determining unit 113 or the area set update unit 115.

In this case, when the area information of the updated area set is transmitted to the in-vehicle apparatus 2, the area information transmitting unit 114 transmits the individual area information 222 other than the transmitted area information 121 among the area information 121 in the updated area set.

For example, when the area information transmitting unit 114 has transmitted previous area information 121 of the reference area set to the in-vehicle apparatus 2 last time and is currently transmitting the area information 121 of the updated area set, the area information transmitting unit 114 subtracts the area information 121 of the reference area set remaining in the updated area set from the area information 121 of the updated area set and transmits the area information 121 of the updated area set.

The in-vehicle apparatus 2 receives only the individual area information 222 of the traveling area that is not included in the reference area set in the updated area set and stores the received individual area information 222, thereby updating the individual area information 222 (differential update).

In this way, the in-vehicle apparatus 2 does not need to receive and store all area information 121 in the updated area set. Therefore, it is possible to reduce the amount of individual area information 222 received from the information providing apparatus 1.

When the area information 121 of the reference area set remaining in the updated area set is updated in the storage unit 12, the area information transmitting unit 114 transmits all area information 121 of the updated area set as the individual area information 222 to the in-vehicle apparatus 2.

The area information transmitting unit 114 may be configured so as to transmit the individual area information 222 as follows. For example, the area information transmitting unit 114 manages the version of the area information 121 and the version of the individual area information 222 transmitted to the in-vehicle apparatus 2.

When transmitting the individual area information 222 to the in-vehicle apparatus 2, the area information transmitting unit 114 compares the version of the latest area information 121 and the version of the individual area information 222 which is stored in the in-vehicle apparatus 2, which is the transmission destination of the individual area information 222.

Then, the area information transmitting unit 114 selects only the area information 121 which is not stored in the in-vehicle apparatus 2, which is the transmission destination of the individual area information 222, on the basis of the comparison result of the two versions, and transmits the selected area information 121 as the individual area information 222 to the in-vehicle apparatus 2. In this way, it is possible to reduce the amount of individual area information 222 received by the in-vehicle apparatus 2.

Although not shown in the drawings, the control unit 11 includes a timing instruction unit that instructs the acquisition timing of the probe information 221 by the in-vehicle apparatus 2 and the transmission timing of the probe information 221 by the information providing apparatus 1.

When it is deter Med that the traveling speed of the vehicle is low, the timing instruction unit instructs the in-vehicle apparatus 2 to make the acquisition period of the probe information 221 and the transmission period of the probe information 221 longer than those before the traveling speed is reduced on the basis of the probe information 221 sequentially received from the in-vehicle apparatus 2.

In this way, for example, when the vehicle is stuck in a traffic jam, it is possible to prevent the in-vehicle apparatus 2 from repeatedly acquiring or transmitting the probe information 221 related to the same traveling area.

When it is determined that the traveling speed of the vehicle has increased, the timing instruction unit instructs the in-vehicle apparatus 2 to make the acquisition period of the probe information 221 and the transmission period of the probe information 221. shorter than those before the traveling speed increases. In this way, the information providing apparatus 1 can uniformly acquire the probe information 221 related to each traveling area, regardless of the speed of the vehicle.

The timing instruction unit may instruct the in-vehicle apparatus 2 of the vehicle that travels through an area having a sufficient amount of accumulated probe information 221 to make the acquisition period and the transmission period of the probe information 221 longer than those of the vehicle apparatus 2 of the vehicle that travels through another area.

The timing instruction unit may instruct the in-vehicle apparatus 2 of the vehicle that travels through an area having a relatively small amount of accumulated probe information 221 to make the acquisition period and the transmission period of the probe information 221 shorter than those of the vehicle apparatus 2 of the vehicle that travels through another area. In this way, the information providing apparatus 1 can uniformly acquire the probe information 221 related to each traveling area.

Although not shown in the drawings, the control unit 11 includes a channel instruction unit that instructs the in-vehicle apparatus 2 to select a broadcast channel to be received. When the in-vehicle apparatus 2 includes a plurality of tuners, the channel instruction unit instructs a broadcast channel to be selected by the tuner that is not selected by the user.

The channel instruction unit instructs the in-vehicle apparatus 2 to receive a broadcast channel in which the amount of information related to reception intensity is small in the area information 121. In this way, the information providing apparatus 1 can uniformly acquire information related to the reception intensity of each broadcast channel.

Next, the procedure of determining the reference area set, the procedure of creating the updated area set, and the procedure of creating the area set information will be described with reference to FIGS. 7A to 8D. FIG. 7A to 7D are diagrams illustrating the procedure of determining the reference area set, the procedure of creating the updated area set, and the procedure of creating the area set information according to this embodiment. FIGS. 8A to 8D are diagrams illustrating a modification of the procedure of creating the updated area set according to this embodiment.

Figure 7A:
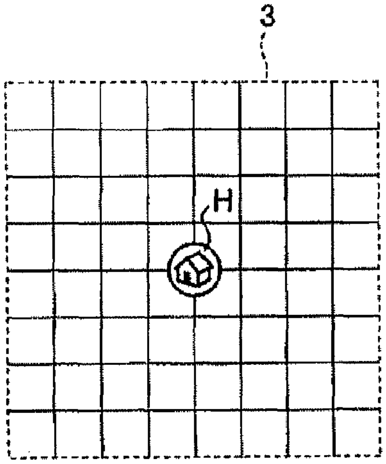
FIGS. 7A to 7D are diagrams illustrating a procedure of determining a reference area set, a procedure of creating an updated area set, and a procedure of creating an area set information according to this embodiment.

When a predetermined reference position and vehicle information are input from the probe information receiving unit 111, first, the reference area set determining unit 113 determines a reference position H, as shown in FIG. 7A. Then, the reference area set determining unit 113 determines a reference area set 3 consisting of a predetermined number of (in this embodiment, 64) traveling areas that are within a predetermined distance from the reference position H.

Then, the reference area set determining unit 113 outputs the mesh Ms of 64 traveling areas in the determined reference area set 3 and the vehicle information input from the probe information receiving unit 111 to the storage unit 12 so as to be associated with each other, thereby creating the area set information 123.

When the reference area set 3 is determined in this way, the area information transmitting unit 114 transmits the area information 121 of the reference area set 3 as the individual area information 222 to the in-vehicle apparatus 2. In this way, the in-vehicle apparatus 2 can receive the area information 121 related to all of the traveling areas in the reference area set 3.

Therefore, the in-vehicle apparatus 2 does not need to receive the area information 121 from the information providing apparatus 1 even when the traveling area of the vehicle is changed in the reference area set 3. Therefore, it is possible to reduce the number of times the in-vehicle apparatus 2 receives the area information 121.

Figure 7B:
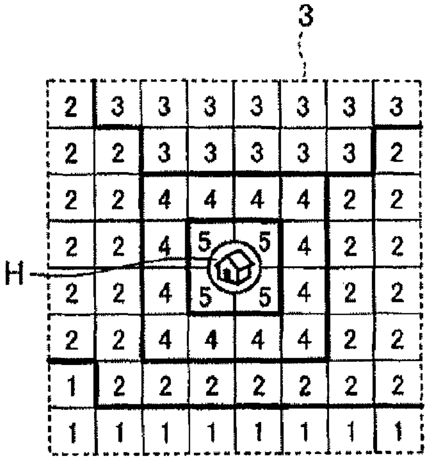

Then, as shown in FIG. 7B, the area set update unit 115 determines the traveling frequency of the vehicle in each traveling area included in the reference area set 3 in five stages on the basis of the probe history 122, The determination of the traveling frequency is not limited to the five stages.

The traveling frequency determined by the area set update unit 115 relates to the vehicle that transmits the reference position H of the reference area set 3. In the example shown in FIG. 7B, it is assumed that the highest traveling frequency is 5 and the lowest traveling frequency is 1.

Figure 7C:
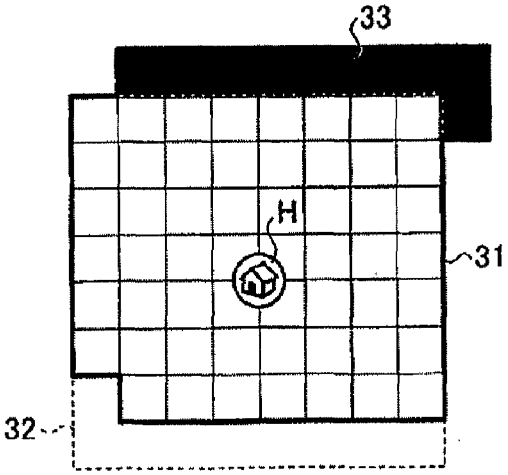

As shown in FIG. 7C, the area set update unit 115 adds and deletes the traveling areas forming the reference area set 3 on the basis of the traveling frequency of the vehicle in each of the traveling areas included in the reference area set 3, thereby creating the updated area set 31.

Specifically, when there is a traveling area (low frequency area) in which the traveling frequency of the vehicle is less than a predetermined lower limit (in this embodiment, the traveling frequency: 2) in the reference area set 3, the area set update unit 115 deletes a low frequency area 32 from the reference area set 3 and creates the updated area set 31, as shown in FIG. 7C.

The area set update unit 115 may set a predetermined available period to each of the traveling areas forming the reference area set 3 or the updated area set 31 of each vehicle. The area set update unit 115 extends the available period for the traveling area through which the corresponding vehicle passes within the available period by a predetermined period of time. On the other hand, the area set update unit 115 deletes the traveling area whose available period has expired from the reference area set 3 or the updated area set 31.

When the traveling frequency of the traveling area forming the edge of the reference area set 3 is equal to or more than a predetermined upper limit (in this embodiment, the traveling frequency: 3), as shown in FIG. 7C, the area set update unit 115 newly adds traveling areas 33 existing around the reference area set 3 to the reference area set 3, thereby creating the updated area set 31.

The area set update unit 115 outputs the mesh ID of each traveling area forming the created updated area set 31 to the storage unit 12, thereby updating the area set information 123. In addition, the area set update unit 115 periodically resets the traveling frequency related to the traveling area of the updated area set 31.

Then, the area set update unit 115 determines the traveling frequency of the vehicle for each traveling area of the updated area set 31. When update is needed, the area set update unit 115 deletes and adds the traveling areas forming the updated area set 31 to update the updated area set 31.

When the updated area set 31 is created, the number of traveling areas added is equal to the number of traveling areas deleted. In this way, it is possible to prevent a communication charge when the in-vehicle apparatus 2 receives the area information 121 from being increased due to the creation or update of the updated area set 31.

As such, since the area set update unit 115 updates the traveling areas included in the reference area set 3 or the updated area set 31 on the basis of the traveling record of the vehicle, it is possible to create the updated area set 31 from the traveling area in which the vehicle is likely to travel.

When the updated area set 31 is created and updated, the area information transmitting unit 114 transmits the area information 121 of the updated area set 31 as the individual area information 222 to the in-vehicle apparatus 2.

In this way, the in-vehicle apparatus 2 can appropriately receive the area information 121 of the traveling area in which the vehicle is expected to frequently travel, without unnecessarily receiving the area information 121 of the traveling area in which the vehicle rarely travels. The in-vehicle apparatus 2 can receive the area information 121 related to all of the traveling areas in the updated area set 31.

When the individual area information 222 is transmitted, the area information transmitting unit 114 selects only the area information 121 updated from the individual area information 121 previously transmitted to the in-vehicle apparatus 2, which is the transmission destination of the individual area information, and transmits the selected area information 121 as the individual area information 222 to the in-vehicle apparatus 2, which is a transmission destination.

Figure 7D:
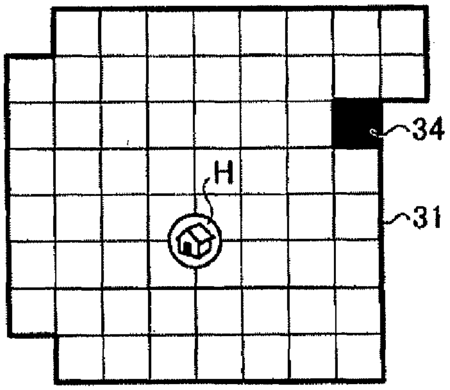

For example, as shown in FIG. 7D, when there is one traveling area 34 whose area information 121 is updated in the updated area set 31, the area information transmitting unit 114 transmits only the area information 121 related to the traveling area 34 as the individual area information 222.

Next, a modification of the procedure of creating the updated area set 31 will be described with reference to FIGS. 8A to 8D. In the example shown in FIGS. 7A to 7D, when the updated area set 31 is created, the number of traveling areas added is equal to the number of traveling areas deleted. However, in the example shown in FIGS. 8A to 8D, the number of traveling areas added is equal to or less than the number of areas deleted.

As shown in FIG. 8A, a case in which the updated area set 31 is created and 9 low frequency areas 32 are deleted will be described. As shown in FIG. 8A, when 9 low frequency areas 32 are deleted, the area set update unit 115 stores the number of virtual traveling areas 35 which is equal to the number of deleted low frequency areas 32 as available area information in the storage unit 12.

The number of virtual traveling areas 35 is reduced by one when one traveling area disposed at any position is added to the updated area set 31.

The area set update unit 115 adds a new traveling area to the updated area set 31 using the number of virtual traveling areas 35 stored in the storage unit 12 as an upper limit, in response to a request from the in-vehicle apparatus 2 or periodically.

For example, as shown in FIG. 8B, it is assumed that the area set update unit 115 receives a request for the area information 121 of a traveling route to a destination P that is disposed outside the updated area set 31 from the in-vehicle apparatus 2 of a vehicle N.

Then, the area set update unit 115 adds the traveling areas corresponding to the traveling route to the destination P to the updated area set 31 using the virtual traveling areas 35. Then, the area information transmitting unit 114 transmits the area information 121 of the added traveling areas as the individual area information 222 to the in-vehicle apparatus 2, which is a request source.

In this case, a communication charge for the transmission and reception of the individual area information 222 is the original communication charge for the transmission or reception of the area information 121 of the low frequency area 32. Therefore, the communication charge after the traveling areas are added using the virtual traveling areas 35 is not higher than that before the traveling areas are added.

As shown in FIG. 8C, it is assumed that the area set update unit 115 detects that the vehicle N deviates from the updated area set 31 on the basis of the probe information 221 transmitted from the in-vehicle apparatus 2 of the vehicle N.

In this case, for example, the area set update unit 115 voluntarily adds the traveling areas deviating from the updated area set to the updated area set 31 using the virtual traveling areas 35. Then, the area information transmitting unit 114 transmits the area information 121 of the added traveling areas as the individual area information 222 to the in-vehicle apparatus 2 of the vehicle N.

As such, even when the virtual traveling areas 35 are used, it is possible to prevent the communication charge when the in-vehicle apparatus 2 receives the individual area information 222 from increasing due to the addition of the traveling areas, similar to the example shown in FIG. 8B.

When a new traveling area is added using the virtual traveling area 35, a traveling area that is disposed away from the updated area set 31 may be newly added, as shown in FIG. 8D.

For example, the area set update unit 115 may newly add a traveling area that is disposed away from the updated area set 31 in response to a request from the in-vehicle apparatus 2 of the vehicle N or voluntarily. When the traveling frequency of the vehicle N in a traveling area that is away from the updated area set 31 is more than a predetermined traveling frequency, the area set update unit 115 voluntarily adds the traveling area on the basis of the probe history 122. When receiving a request from the in-vehicle apparatus 2, the area set update unit 115 adds the traveling area according to the request.

Returning to FIG. 3, the in-vehicle apparatus 2 includes a control unit 21 and a storage unit 22. The storage unit 22 is an information storage device that stores probe information 221 and individual area information 222. The control unit 21 is a processing unit that controls the overall operation of the in-vehicle apparatus 2 and is formed by an information processing device including, for example, a CPU, a ROM, and a RAM.

The control unit 21 includes a probe information acquisition transmitting unit 211, an area information receiving unit 212, and a channel setting unit 213 that are implemented by the CPU to read various kinds of programs from the ROM and use the RAM as a work area.

The probe information acquisition transmitting unit 211 is a processing unit that acquires the probe information 221 with a predetermined period or on the basis of instructions from the information providing apparatus 1, stores the acquired probe information 221 in the storage unit 22, and transmits the probe information 221 to the information providing apparatus 1 with a predetermined period or on the basis of instructions from the information providing apparatus 1.

The area information receiving unit 212 is a processing unit that receives the individual area information 222 transmitted from the information providing apparatus 1 and stores the received individual area information 222 in the storage unit 22. The channel setting unit 213 is a processing unit that sets a receivable broadcast channel on the basis of the individual area information 222 stored in the storage unit 22.

For example, when the reception conditions of a broadcast that is being received are bad, the channel setting unit 213 performs a network following process for switching to a broadcast channel that can be received with a reception intensity higher than the current reception intensity in the traveling area of the vehicle, with reference to the individual area information 222.

When the traveling area is changed due to the traveling of the vehicle, the channel setting unit 213 performs an area preset process of setting, in the background, a plurality of broadcast channels that can be received in the changed traveling area with reference to the individual area information 222.

Figure 9:
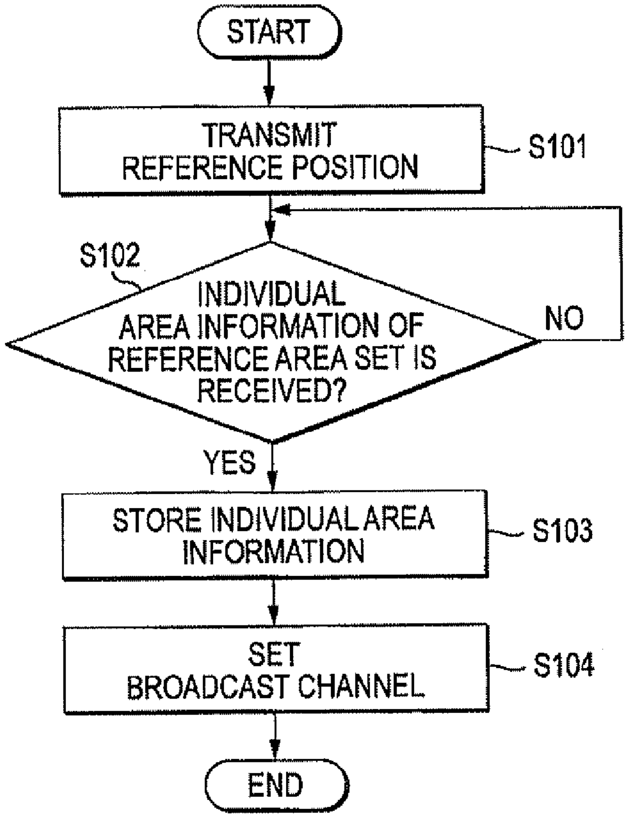
FIG. 9 is a flowchart illustrating a procedure performed by a control unit of an in-vehicle apparatus according to this embodiment.
Figure 10:
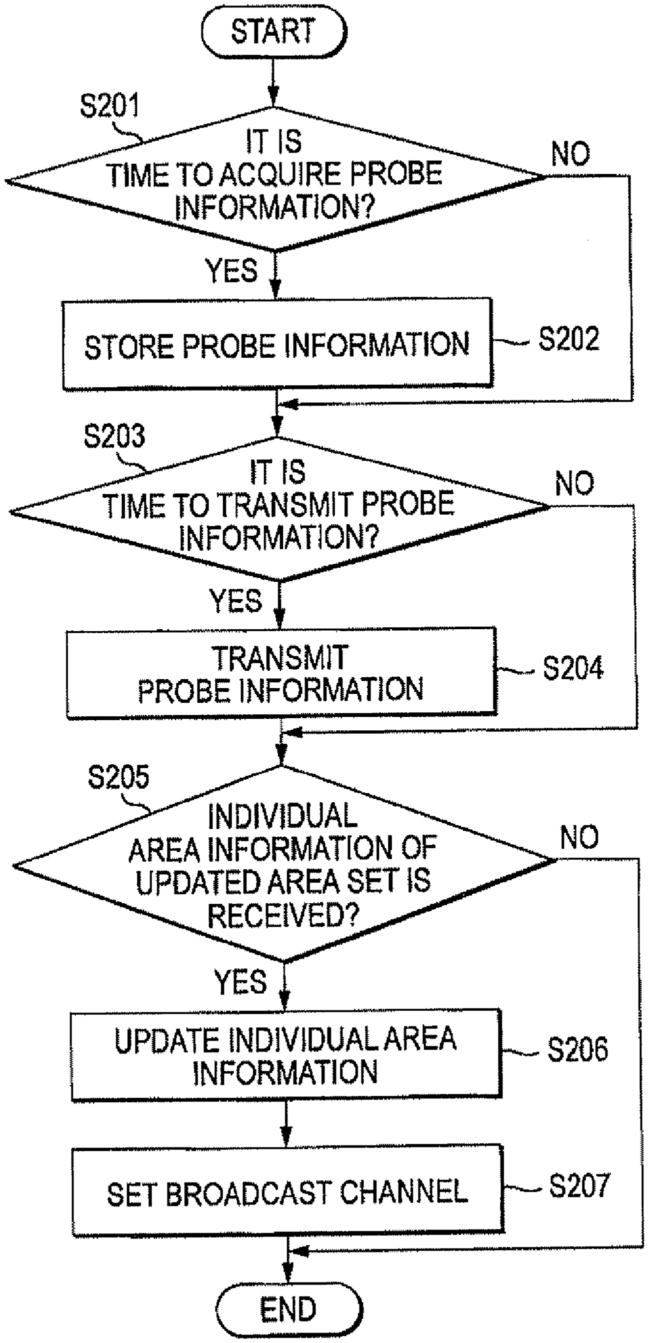
FIG. 10 is a flowchart illustrating a procedure performed by the control unit of the in-vehicle apparatus according to this embodiment.

Next, the procedure performed by the control unit 21 of the in-vehicle apparatus 2 will be described with reference to FIGS. 9 and 10. FIGS. 9 and 10 are flowcharts illustrating the procedure performed by the control unit 21 of the in-vehicle apparatus 2 according to this embodiment. FIGS. 9 and 10 show only a process related to the reception of the individual area information 222, in the procedure performed by the control unit 21.

When the area information providing system according to this embodiment is newly used, as shown in FIG. 9, first, the control unit 21 of the in-vehicle apparatus 2 transmits the reference position H to the information providing apparatus 1 (Step S101). Then, the control unit 21 determines whether the individual area information 222 of the reference area set 3 is received from the information providing apparatus 1 (Step S102).

When it is determined that the individual area information 222 is not received (Step S102, No), the control unit 21 repeatedly performs the determination process of Step 5102 until the individual area information 222 is received.

On the other hand, when it is determined that the individual area information 222 is received (Step S102, Yes), the control unit 21 stores the individual area information 222 in the storage unit 22 (Step S103). Then, the control unit 21 sets a broadcast channel on the basis of the individual area information 222 (Step S104) and ends the process.

When the process shown in FIG. 9 ends, the control unit 21 starts the process shown in FIG. 10. That is, when the process shown in FIG. 9 ends, the control unit 21 determines whether it is time to acquire the probe information 221, as shown in FIG. 10 (Step S201).

When it is determined that it is time to acquire the probe information 221 (Step S201, Yes), the control unit 21 acquires the probe information 221 and stores it in the storage unit 22 (Step S202). Then, the process proceeds to Step S203.

On the other hand, when the control unit 21 determines that it is not time to acquire the probe information (Step S201, No), the process proceeds to Step S203. The control unit 21 determines whether it is time to transmit the probe information 221 in Step S203.

When the control unit 21 determines that it is not time to transmit the probe information 221 (Step S203, No), the process proceeds to Step S205. On the other hand, when it is determined that it is the time to transmit the probe information 221 (Step S203, Yes), the control unit 21 transmits the probe information 221 to the information providing apparatus 1 (Step S204).

Then, the control unit 21 determines whether the individual area information 222 of the updated area set 31 is received (Step S205). When it is determined that the individual area information 222 is not received (Step S205, No), the control unit 21 ends the process.

On the other hand, when it is determined that the individual area information 222 is received (Step S205, Yes), the control unit 21 updates the individual area information 222 stored in the storage unit 22 with the received individual area information 222 (Step S206).

Then, the control unit 21 sets the broadcast channel on the basis of the updated individual area information 222 (Step S207). Then, the control unit 21 ends the process. The control unit 21 repeatedly performs the process shown in FIG. 9 while the in-vehicle apparatus 2 is turned on.

Figure 11:
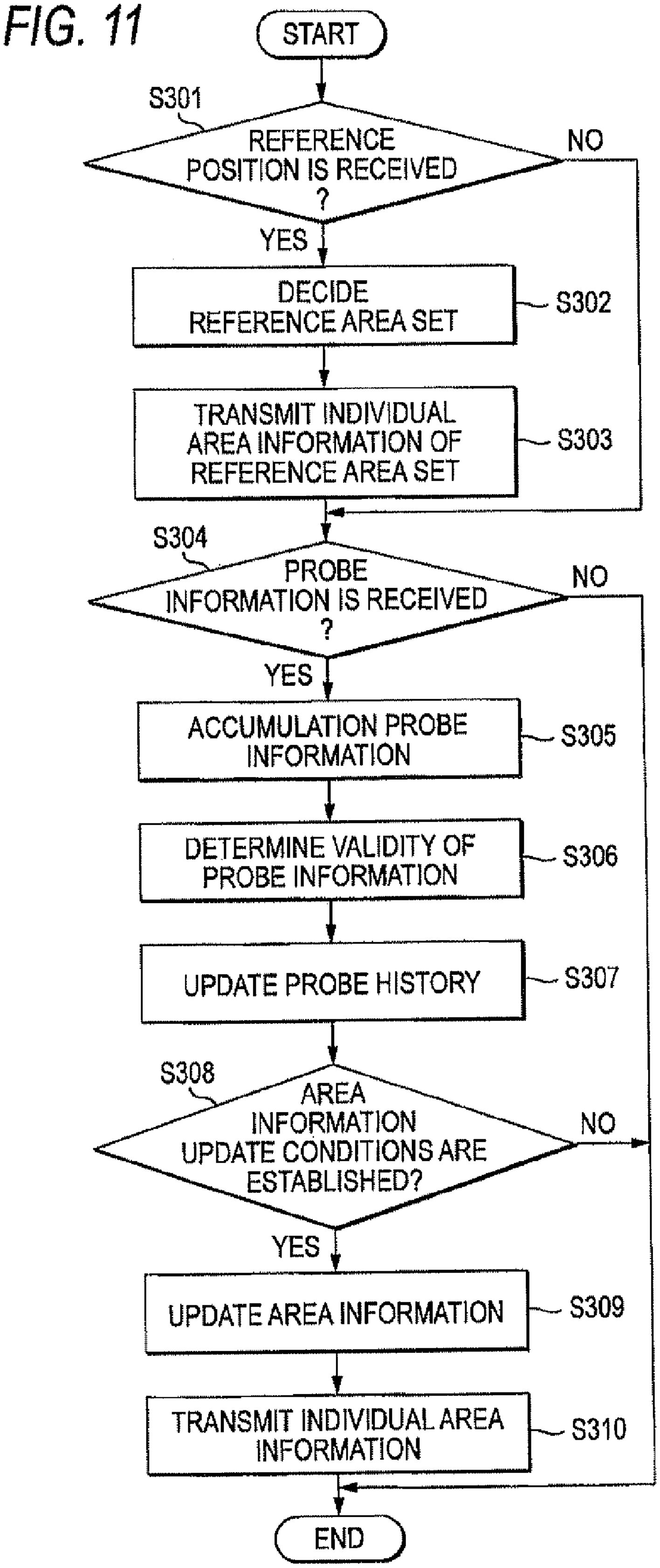
FIG. 11 is a flowchart illustrating a procedure performed by a control unit of an information providing apparatus according to this embodiment.
Figure 12:
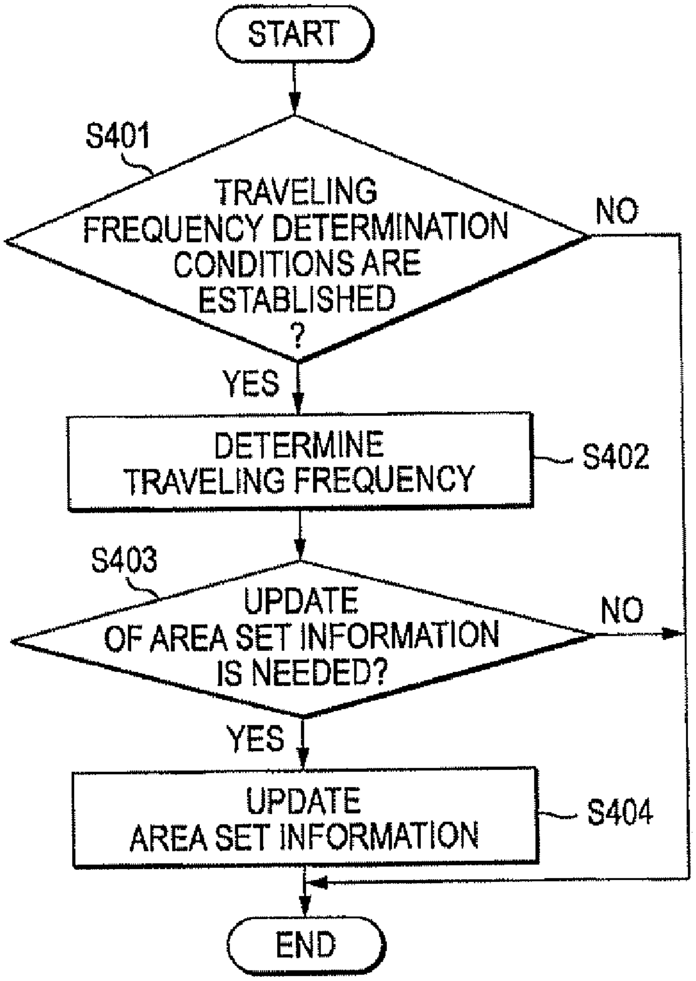
FIG. 12 is a flowchart illustrating a procedure performed by the control unit of the information providing apparatus according to this embodiment.

Next, the procedure performed by the control unit 11 of the information providing apparatus 1 will be described with reference to FIGS. 11 and 12. FIGS. 11 and 12 are flowcharts illustrating the procedure performed by the control unit 11 of the information providing apparatus 1 according to this embodiment. FIGS. 11 and 12 show only the processes related to the transmission of the individual area information 222 in the procedure performed by the control unit 11.

When the information providing apparatus 1 is turned on, as shown in FIG. 11, first, the control unit 11 of the information providing apparatus 1 determines whether the reference position H is received from the in-vehicle apparatus 2 (Step S301). When the control unit 11 determines that the reference position H is not received (Step S301, No), the process proceeds to Step S304.

When it is determined that the reference position H is received (Step S301, Yes), the control unit 11 determines the reference area set 3 (Step S302) and transmits the individual area information 222 of the reference area set 3 to the in-vehicle apparatus 2 (Step S303). Then, the control unit 11 determines whether the probe information 221 is received from the in-vehicle apparatus 2.

When it is determined that the probe information 221 is not received (Step S304, No), the control unit 11 ends the process. On the other hand, when it is determined that the probe information 221 is received (Step S304, Yes), the control unit 11 stores the received probe information 221 in the probe history 122 (Step S305).

Then, the control unit 11 determines the validity of the probe information 221 received in Step S305 (Step S306). The control unit deletes the probe information 221 that is determined to be invalid from the probe history 122, thereby updating the probe history 122 (Step S307). Then, the control unit 11 determines whether the update conditions of the area information 121 are established (Step S308).

The control unit 11 determines that the update conditions are established when the number of probe information items 221 stored in the probe history 122 after the previous area information 121 is updated reaches a predetermined value. When it is determined that the update conditions are not established (Step S308, No), the control unit 11 ends the process.

When it is determined that the update conditions are established (Step S308, Yes), the control unit 11 updates the area information 121 (Step S309), transmits the updated area information 121 as the individual area information 222 to the in-vehicle apparatus 2 (Step S310), and ends the process.

The control unit 11 transmits only the updated area information 121 in the reference area set 3 or the updated area set 31 related to the in-vehicle apparatus 2, which is the transmission destination of the individual area information 222, as the individual area information 222. When the process ends, the control unit 11 repeatedly performs the process shown in FIG. 11 while the information providing apparatus 1 is turned on.

The control unit 11 performs the process shown in FIG. 12 in parallel to the process shown in FIG. 11. That is, the control unit 11 determines whether traveling frequency determination conditions are established while the process shown in FIG. 11 is performed, as shown in FIG. 12 (Step S401).

The control unit 11 determines that traveling frequency reflection conditions are established when the number of probe information items 221 stored in the probe history 122 after the previous traveling frequency determination process reaches a predetermined value. When it is determined that the traveling frequency determination conditions are not established (Step S401, No), the control unit 11 ends the process.

On the other hand, when it is determined that the traveling frequency determination conditions are established (Step S401, Yes), the control unit 11 determines the traveling frequency of each vehicle in each traveling area (Step S402). Then, the control unit 11 determines whether the area set information 123 needs to be updated (Step S403).

When there is a traveling area with a traveling frequency of 1 in the reference area set 3 or each updated area set 31, the control unit 11 determines that the area set information 123 needs to be updated. When it is determined that update is not needed (Step S403, No), the control unit 11 ends the process.

On the other hand, when it is determined that update is needed (Step S403, Yes), the control unit 11 deletes the mesh ID of the traveling area with a traveling frequency of 1 from the area set information 123 to update the area set information 123 (Step S404).

When there is a traveling area to be added to each reference area set 3 or each updated area set 31, the control unit 11 adds the traveling area to the reference area set 3 or the updated area set 31 using the number of deleted mesh IDs as the upper limit.

The control unit 11 adds the mesh ID of the added traveling area to the area set information 123, thereby updating the area set information 123 (Step S404). Then, the control unit 11 ends the process and repeatedly performs the process shown in FIG. 12 while the information providing apparatus 1 is turned on.

As described above, in the information providing system according to this embodiment, the information providing apparatus 1 determines the reference area set 3 consisting of a plurality of traveling areas that is disposed within a predetermined distance from the reference position H on the basis of the reference position H received from the in-vehicle apparatus 2.

Then, the information providing apparatus 1 transmits the area information 121 of all of the traveling areas included in the determined reference area set 3 as the individual area information 222 to the in-vehicle apparatus 2, which is the transmission source of the reference position H.

Therefore, the in-vehicle apparatus 2 does not need to receive the area information 121 from the information providing apparatus 1 while the vehicle travels in the reference area set. As a result, it is possible to reduce the number of times the in-vehicle apparatus 2 receives the area information 121.

In addition, the information providing apparatus 1 creates the updated area set 31 on the basis of the traveling frequency of each vehicle in each traveling area, and transmits the area information 121 of all of the traveling areas included in the updated area set 31 as the individual area information 222 to the in-vehicle apparatus 2.

Therefore, the in-vehicle apparatus 2 does not need to receive the area information 121 from the information providing apparatus 1 while the vehicle travels in the updated area set 31. As a result, it is possible to reduce the number of times the in-vehicle apparatus 2 receives the area information 121.

The individual area information 222 received from the information providing apparatus 1 to the in-vehicle apparatus 2 is the area information 121 that is limited to the reference area set 3 or the updated area set in which the vehicle provided with the in-vehicle apparatus 2 is likely to travel. Therefore, it is possible to prevent an increase in the amount of information received by the in-vehicle apparatus 2 from the information providing apparatus 1.

In this embodiment, the in-vehicle apparatus 2 transmits the probe information 221 including the reference position H to the information providing apparatus 1. However, the in-vehicle apparatus 2 may transmit the reference position H to the information providing apparatus 1 through a communication line different from that for the probe information 221. For example, the reference position H may be transmitted from a communication terminal apparatus used by the user of the in-vehicle apparatus 2 to the information providing apparatus 1 through a phone line or the Internet.

What is claimed is:

1. An information providing system, comprising:

an in-vehicle apparatus provided in a vehicle, the in-vehicle apparatus that receives a broadcasting; and an information providing apparatus that transmits area information related to a broadcast channel that is receivable in a traveling area of the vehicle to the in-vehicle apparatus, wherein the information providing apparatus includes:

a storage unit storing the area information for each traveling area;

a receiving unit that receives probe information including a predetermined reference position or a position of the vehicle from the in-vehicle apparatus;

a deciding unit that decides a reference area set including a plurality of traveling areas which are within a predetermined distance from the reference position included in the probe information received by the receiving unit for each vehicle;

an accumulating unit that accumulates the probe information received by the receiving unit;

a determining unit that determines a traveling record of the vehicle in each traveling area on the basis of the probe information accumulated in the accumulating unit;

an update unit that updates the reference area set on the basis of the traveling record of the vehicle, determined by the determining unit; and a transmitting unit that transmits the area information corresponding to the reference area set before the update to the in-vehicle apparatus corresponding to the reference area set when the update unit has not yet performed the update, and transmits the area information corresponding to the reference area set after the update to the in-vehicle apparatus corresponding to the reference area set when the update unit has performed the update.

2. The information providing system as set forth in claim 1, wherein the determining unit determines traveling frequency of the vehicle in each traveling area as the traveling record, and wherein the update unit deletes the traveling area in which the determining unit determines that the traveling frequency of the vehicle is less than a predetermined lower limit from the reference area set of the vehicle.

3. The information providing system as set forth in claim 2, wherein when the traveling area in which the determining unit determines that the traveling frequency of the vehicle is equal to or greater than a predetermined upper limit is disposed at an edge of the reference area set, the update unit adds traveling areas disposed outside the edge to the reference area set including the traveling area.

4. The information providing system as set forth in claim 1, wherein the probe information includes a reception intensity of a broadcast signal of each broadcast channel that is received by the in-vehicle apparatus, wherein the information providing apparatus further includes an area information update unit that updates the area information on the basis of the position of the vehicle included in the probe information accumulated in the accumulating unit and the reception intensity, and wherein when the area information updated by the area information update unit is included in the reference area set, the transmitting unit transmits the area information to the in-vehicle apparatus corresponding to the reference area set.

* * * * *